United States Patent
Jenkins et al.

(10) Patent No.: US 9,914,094 B2
(45) Date of Patent: Mar. 13, 2018

(54) MARINE EXHAUST GAS CLEANING SYSTEM

(71) Applicant: MARINE EXHAUST SOLUTIONS INC., Montreal (CA)

(72) Inventors: Garth E. Jenkins, Stratford (CA); Kiley G. Sampson, Fletchers Lake (CA); David S. Dumont, Shoreline, WA (US); Seyed Milad Mousavi, Montreal (CA)

(73) Assignee: MARINE EXHAUST SOLUTIONS INC., Montreal (CA)

( * ) Notice: Subject to any disclaimer, the term of this patent is extended or adjusted under 35 U.S.C. 154(b) by 0 days.

(21) Appl. No.: 15/110,966

(22) PCT Filed: Jan. 16, 2015

(86) PCT No.: PCT/CA2015/050030
§ 371 (c)(1),
(2) Date: Jul. 12, 2016

(87) PCT Pub. No.: WO2015/106355
PCT Pub. Date: Jul. 23, 2015

(65) Prior Publication Data
US 2016/0332113 A1    Nov. 17, 2016

Related U.S. Application Data

(60) Provisional application No. 61/928,726, filed on Jan. 17, 2014.

(51) Int. Cl.
*B01D 47/10* (2006.01)
*B01D 53/18* (2006.01)
(Continued)

(52) U.S. Cl.
CPC ........... *B01D 53/502* (2013.01); *B01D 47/06* (2013.01); *B01D 47/10* (2013.01); *B01D 53/18* (2013.01);
(Continued)

(58) Field of Classification Search
CPC .. B01D 47/06; B01D 53/38; B01D 2251/604; B01D 2251/402; B01D 2247/105;
(Continued)

(56) References Cited

U.S. PATENT DOCUMENTS

| 3,793,809 A | 2/1974 | Tomany et al. |
| 2012/0312166 A1 | 12/2012 | Theis et al. |

FOREIGN PATENT DOCUMENTS

| CA | 2464269 A1 | 6/2003 |
| CA | 2588409 A1 | 11/2007 |

(Continued)

OTHER PUBLICATIONS

Wartsila Moss flue gas system & topping up generator, May 2013, http://cdn.wartsila.com/docs/default-source/product-files/inert-gas/wartsila-moss-flue-gas-system-topping-up-gen.
(Continued)

*Primary Examiner* — Anthony J Zimmer
*Assistant Examiner* — Syed Iqbal
(74) *Attorney, Agent, or Firm* — Eric L. Lane; Green Patent Law (57) ABSTRACT

A marine exhaust gas scrubbing device including an enclosure having a first end and a second end, an exhaust gas inlet, at least one quencher, at least one pre-treater, at least one venturi component including a venturi inlet and a venturi outlet, an impingement basket, at least one demister, an exhaust gas outlet, and a receiver, and a process for scrubbing a marine exhaust gas including cooling the exhaust gas,
(Continued)

pre-treating the exhaust gas, washing the exhaust gas, mixing the exhaust gas and exhausting the scrubbed exhaust gas.

24 Claims, 6 Drawing Sheets

(51) Int. Cl.
*B01D 47/06* (2006.01)
*B01D 53/38* (2006.01)
*B01D 53/50* (2006.01)

(52) U.S. Cl.
CPC .......... *B01D 53/38* (2013.01); *B01D 53/504* (2013.01); *B01D 2247/105* (2013.01); *B01D 2247/107* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2251/604* (2013.01); *B01D 2257/302* (2013.01); *B01D 2259/4566* (2013.01)

(58) Field of Classification Search
CPC ............ B01D 2251/304; B01D 53/504; B01D 2247/107; B01D 2251/404; B01D 2251/302; B01D 2259/4566; B01D 2251/306; B01D 53/502; B01D 2257/302; B01D 47/10
See application file for complete search history.

(56) References Cited

FOREIGN PATENT DOCUMENTS

CA 2765209 A1 12/2009
EP 1797943 A1 * 6/2007 ............. B01D 53/18

OTHER PUBLICATIONS

International Search Report dated Apr. 30, 2015 in related International Patent Application No. PCT/CA2015/050030.
Written Opinion dated Apr. 30, 2015 in related International Patent Application No. PCT/CA2015/050030.
International Preliminary report on Patentability dated Jul. 19, 2016 in related International Patent Application No. PCT/CA2015/050030.
Office Action dated Oct. 20, 2017 in related Canadian Patent Application No. 2,936,603.

* cited by examiner

MARINE EXHAUST GAS CLEANING SYSTEM

FIELD OF THE INVENTION

This invention relates to a marine exhaust gas scrubbing device for removing by-products such as sulfur dioxide and particulate matter from marine engine exhaust gas, and a process for scrubbing marine exhaust gas to removing said by-products.

BACKGROUND OF THE INVENTION

Commercial shipping has become one of the largest sources of air pollution in Europe. As a result, the International Maritime Organization (IMO) has tightened its requirements for reduction of emissions of sulfur oxides (SOx) and particulate matter (PM) (see for example the 59th session of the Marine Environment Protection Committee, 16 Jul. 2009). One way of reducing oxides of sulfur is to use low-sulfur fuels. However, the cost of such fuels is more than current marine fuels and when consumed at the rate that ships require, introduces significant costs to the ship owners. Fortunately, IMO regulations allow the use of alternative technologies to reduce SOx emissions from conventional marine fuels.

Absorption involves bringing contaminated effluent gas into contact with a liquid absorbent so that one or more constituents of the effluent gas are selectively dissolved into a relatively nonvolatile liquid.

Scrubbing effectiveness relates to Henry's Law: the mass of a gas that dissolves in a definite volume of liquid is directly proportional to the pressure of the gas:

$P=Hx$ x is the solubility of a gas in the solution phase

H is Henry's constant

P is the partial pressure of a gas above the solution.

Dissolving a gas in a liquid is usually an exothermic process. Therefore, lowering the temperature generally increases the solubility of gases in liquids.

$SO_x$ gases (in particular $SO_2$) are formed when fuels that contain sulfur are burned. $SO_2$ dissolves in water vapour to form acid and interacts with other gases and particles in the air to form sulfates and other products harmful to people and the environment (e.g., sulfurous smog and acid rain). $SO_2$ solubility in water rises steeply as the temperature of the water-gas mixture decreases.

Absorption systems are designed to transfer the $SO_2$ from a gas phase to a liquid phase, which is accomplished by providing intimate contact between the gas and the liquid, which allows optimum diffusion of the gas into the solution. Without being bound by theory, the mechanism of removal of a pollutant from the gas stream takes place in three steps: 1) diffusion of the pollutant gas to the surface of the liquid, 2) transfer across the gas-liquid interface, and 3) diffusion of the dissolved gas away from the interface into the liquid.

The transfer of a substance from one phase (gas) to another phase (liquid) requires time. The rate of transfer is proportional to the surface of contact between the phases, the resistance to the transfer, and the driving force present for the mass transfer, and can be represented by the following formula:

Rate of Transfer=(Driving Force)×(Area available for Transfer)/(Resistance to Transfer)

Any increase in the transfer rate leads to a more compact mass transfer device that is generally more economical.

The Driving Force is the chemical potential of the substance to be transferred. Every substance has a chemical (or "mass") potential which drives it from one phase to another. The value (Y1−Y2) is the difference in concentration (or driving force) in the gas phase. The value (X1−X2) is the difference in concentration (or driving force) in the liquid phase The required gas mass transfer (i.e., Y1−Y2) in the system can be expressed by the required number of gas mass Net Transfer Units (NTUs). The required number of NTUs for the system can be determined as follows:

Heavy Fuel contains 3.5% sulfur concentration or 35,000 ppm

When fuel is burned in an engine, approximately 1,000 ppm of the 35,000 is converted to $SO_2$ gas (the rest of the sulfur is not combusted and is attached to particles, etc.)

The sulfur gas concentration fed into the exhaust cleansing system is then 1,000 ppm Hence, Y1=1,000 ppm The required Y2 to meet MARPOL Annex VI regulations is approx <=30 ppm Hence, Y2=30 ppm Giving Y1−Y2=1000−30=970 ppm In logarithmic form we have:

$Ln(Y1-Y2)=Ln(Y1)/Ln(Y2)=Ln(Y1/Y2)=Ln(1000/30)=3.50$

The value 3.50 is defined as the required number of gas mass transfer units that is required to be removed (i.e., $SO_2$ gas mass transferred from gas to liquid state)

NTU-R=Net Transfer Units Required by System=3.50

Thus, NTU-R can be viewed as the required gas mass transfer efficiency of the system.

As the gas transits the system over time "t0" to time "tn" the $SO_2$ gas concentration must be reduced from 1,000 ppm to 30 ppm. In other words, the system should have a gas mass transfer capability of 3.50 NTUs, i.e. $Ln(Y1-Y2)=Ln(Y)/Ln(Y2)=Ln(Y1/Y2)=Ln(1000/30)=3.50$. As the exhaust gas travels through the cleaning reactor system, the $SO_2$ is absorbed at different rates and at different efficiencies; the reason is that the Driving Force (chemical potential) of the $SO_2$ substance to be transferred from the gas to liquid decreases.

In constructing a gas cleaning system with a number of gas cleaning zones, the zones can be arranged in series. For example, the exhaust gas transits the cleaning zones over time t0 to tn. Each zone has its own cleaning capability (i.e., efficiency) which is measured by the Zone's NTU value; the zone efficiency depends on $SO_2$ concentration, temperature, surface contact area, contact time within the zone, etc. The sum of capabilities for all zones must equal the required gas mass transfer capability which in this instance is Sum of NTU for all Zones=3.50

Adsorption is a mass transfer process that involves passing a gas stream through the surface of prepared porous solids (adsorbents). The surfaces of the porous solid substance attract and hold the gas by physical or chemical adsorption. In other words, adsorption is the bonding of two particles or molecules. An adsorbent may be any solid material which provides bonding sites. In the case of a gas cleaning system, the particulate matter particles provide the bonding sites. An adsorbate may be any dissolved molecular substance or particles in suspension. In the case of a gas cleaning system, there are three adsorbates (i.e., three types of things that are being bonded to the adsorbent):

1. $SO_2$ molecules in the gas steam are being bonded to particulate matter (PM) particles 2. VOC (Volatile Organic Compounds) are being bonded to PM particles
3. Small PM particles are being bonded to larger PM particles to form particle clusters.

Current technologies for reducing SOx emissions from flue gases include wet scrubbers using sodium hydroxide solutions. However, equipment employing these technologies is large and cumbersome and cannot be deployed easily in the limited confines on board ships. Other factors limiting a wet scrubber for use on board a ship include weight and electrical power limitations.

U.S. Pat. No. 7,018,451 discloses a method for removing sour gas and acid gas components from gas mixture by absorption using a solvent or reagent and turbulent mixing of the gas with the solvent or reagent.

U.S. Pat. No. 7,273,513 discloses a method for simultaneously absorbing selected acid gas components from a gas stream and flashing off hydrocarbons entrained in a liquid stream including a solvent or reagent, wherein the reagent is an amine.

U.S. Pat. No. 8,524,180 discloses a method for removing particulate matter from diesel exhaust gases using water or an aqueous solution of bases or salts with a minimal drop in exhaust pressure.

U.S. Application Publication 2013/0213231 discloses a double-pipe apparatus and method for scrubbing flue gases using cyclonic action and fans to increase the flue gas velocity through the apparatus. The flue gas scrubbing is achieved using a fluid comprising an aqueous basic solution.

Thus, there remains a long-felt need for a wet flue gas scrubber that is efficient, compact, and of straightforward design, in particular, one that meets these technical requirements while being sufficiently compact to be used, e.g., on board a ship.

SUMMARY OF THE INVENTION

The marine exhaust gas scrubbing device of the present invention is a system, preferably a closed-loop system designed for reduction in sulfur dioxide, preferably at least about 98% reduction in sulfur dioxide while burning residual fuel oil up to 3.5% sulfur content.

In one aspect of the invention, there is provided a marine exhaust gas scrubbing device comprising:
a) an enclosure having a first end and a second end;
b) an exhaust gas inlet proximate said first end for accepting a high temperature exhaust gas comprising sulfur dioxide and particulate matter,
c) at least one quencher proximate the exhaust gas inlet for cooling the high temperature exhaust gas; preferably with at least one quenching fluid giving a cooled exhaust gas;
d) at least one pre-treater for pre-treating the cooled exhaust gas with at least one pre-treating fluid to give a pre-treated exhaust gas;
e) at least one venturi component, in one embodiment a concentric venturi component, comprising a venturi inlet for accepting the pre-treated exhaust gas and a venturi outlet for washing the pre-treated exhaust gas with at least one washing fluid resulting in a washed exhaust gas comprising a plurality of droplets of said at least one washing fluid and conveying the washed exhaust gas to the venturi outlet; preferably said at least one washing fluid is introduced via at least one washing nozzle. In another embodiment, the device comprises at least two or more venturi components. In one embodiment, each of the at least two or more venturi components are of similar size and configuration. In another embodiment, each of the at least two or more venturi components are of different sizes. In another embodiment, each of the at least two or more venturi components are of different configurations. In a preferred embodiment, the at least two or more venturi components are in parallel. Preferably on a half circle curve to balance flow between the at least two or more venturi components;
f) an impingement basket proximate the venturi outlet for providing additional mixing of the washed exhaust gas with the at least one washing fluid;
g) at least one demister for removing the plurality of washing fluid droplets from the washed exhaust gas, forming a substantially demisted exhaust gas;
h) an exhaust gas outlet proximate said second end for exhausting said substantially demisted exhaust gas; and
i) a receiver for receiving the at least one quenching fluid, the at least one pre-treating fluid and the at least one washing fluid.

In one embodiment, the at least one quencher comprises at least one quenching nozzle, preferably a plurality of quenching nozzles for emitting said at least one quenching fluid. In one embodiment, the at least one quencher preferably comprises from four to eight quenching nozzles, most preferably six quenching nozzles.

In another embodiment, the at least one pre-treater comprises at least one pre-treating nozzle, preferably a plurality of pre-treating nozzles for emitting said at least one pre-treating fluid. In one embodiment, the pre-treater preferably comprises from 20 to 30 pre-treating nozzles, most preferably 24 pre-treating nozzles. In another embodiment, the pre-treater preferably comprises at least one low flowrate pre-treating nozzle, preferably a twin-fluid pre-treating nozzle, more preferably a plurality of twin-fluid pre-treating nozzles, preferably between 6 to 10 twin fluid pre-treating nozzles, most preferably 8 twin-fluid pre-treating nozzles. Preferably said twin-fluid pre-treating nozzle allows for at least one compressible fluid, preferably at least one gas, to be mixed with said at least one pre-treating fluid, preferably for atomizing said at least one pre-treating fluid producing a fine spray. Preferably said low flowrate is less than 1 liter per minute, more preferably from about 1 and 10 liters per minute, depending on exhaust gas flow rate entering the system. In another embodiment, said at least one pre-treating nozzle angled such that the pre-treating fluid is expelled upwards in a rotational flow to produce an upward vortex flow. Preferably angled at an angle greater than zero to the base of the device to less than 90 degrees, preferably between about 10 degrees and about 80 degrees, more preferably about 45 degrees. The rotational flow creates/increases suction and turbulence zone, due to Bernoulli's principle, drawing the exhaust gas upwards into the device, producing a higher surrounding pressure and lower core pressure, reducing the exhaust gas backpressure.

In another embodiment, the at least one venturi component further comprises a convergent-divergent passageway joining the venturi inlet with the venturi outlet.

In yet another embodiment, said at least one venturi component further comprises at least one flow element to assist in rotational flow of said exhaust gas passing through said at least one venturi component and/or cause a turbulent mixing zone increasing the probability of collision between the at least one washing fluid and the exhaust gas. Preferably said at least one flow element is proximate said venturi inlet, more preferably distant said venturi outlet. In a preferred embodiment, said at least one flow element is on the convergent side of said at least one venturi component. Preferably said at least one flow element is a blade. More preferably said at least one flow element is a blade angled with respect to the venturi convergent side to promote rotational flow and/or turbulent mixing of said exhaust gas and said washer fluid into said convergent/divergent passageway and out through said venturi outlet. In one embodiment, said at least one flow element is a plurality of blades angled with respect to the venturi convergent side. Preferably between 4 to 12 blades, more preferably between 6 to 10 blades, even more preferably 8 blades. In one embodiment said blades are evenly spaced from each other. In another embodiment, said blades are randomly spaced from each other. In another embodiment, said blades are angled the same. In one embodiment, said at least one flow element is welded to the wall of the converging section.

Preferably the at least one flow element, more preferably at least two flow elements, produces more uniform rotational flow with a lower core pressure in the venturi component, lowering the backpressure on the engine of a ship.

Preferably any particulate matter may be separated from the exhaust gas at this stage due to the centrifugal forces on the forced vortex (rotational flow) produced in the venturi component.

Preferably the rotation of the exhaust gas increases the residence time in the system, thereby increasing contact time between the washing fluid and the exhaust gas.

In another embodiment, the at least one demister comprises an element to reduce mist and/or droplets in said exhaust gas, preferably comprising a mesh, a wire frame, a filter and/or any demister known to a person skilled in the art. In another embodiment, said device further comprises at least one demister soot cleaning washdown nozzle, for reducing preferably cleaning soot from the device. Preferably a plurality of demister soot cleaning washdown nozzles for emitting said at least one soot cleaning fluid. In one embodiment, the at least one demisting soot cleaning washdown nozzle preferably comprises from five to ten nozzles, most preferably eight nozzles.

In another embodiment, the at least one quenching nozzle, the at least one pre-treating nozzle, the at least one demister soot cleaning washdown nozzle and the at least one washing nozzle may be constructed from any material known in the art to be corrosion and heat resistant.

Preferably the material is selected from the group consisting of copper nickel (70/30), bronze, nickel aluminum bronze, duplex stainless steel, alloy 20, AL6XN, Hastelloy and GRE, and the like.

In another embodiment the quencher and pre-treater are combined to cool and pre-treat the exhaust gases to give a cooled and pre-treated exhaust gas.

In another embodiment, the marine exhaust gas scrubbing device further comprises a turbulent mixing zone generator between the pre-treater and venturi component. Preferably, the turbulent mixing zone generator comprises a valve. More preferably the valve is selected from a butterfly valve and ball valve. Most preferably the valve is a butterfly valve.

In another embodiment, the at least one quenching fluid, the at least one pre-treating fluid and the at least one washing fluid comprise the same or different kinds of fluid. In a preferred embodiment, the at least one quenching fluid, the at least one pre-treating fluid and the at least one washing fluid comprise the same kind of fluid. Preferably the at least one quenching fluid, the at least one pre-treating fluid and the at least one washing fluid are basic and comprise an aqueous solution comprising a metal hydroxide. The metal hydroxide may be selected from an alkali metal hydroxide, an alkaline earth metal hydroxide and combinations thereof, preferably in the form of a solid or concentrated aqueous solution. More preferably the alkali metal hydroxide is selected from the group consisting of lithium hydroxide, sodium hydroxide, potassium hydroxide and combinations thereof, and the alkaline earth metal hydroxide is selected from the group consisting of calcium hydroxide, magnesium hydroxide, and combinations thereof. Most preferably the metal hydroxide is sodium hydroxide. The at least one quenching fluid, the at least one pre-treating fluid and the at least one washing fluid optionally further comprises seawater, fresh water and combinations thereof.

In a preferred embodiment, the at least one quenching fluid, the at least one pre-treating fluid and the at least one washing fluid have a pH of between about 8 and about 14, preferably between about 10 and about 14 and most preferably about 12.

In another embodiment, the enclosure and the elements contained therein of said scrubber device may be constructed from a material that can resist temperatures typical in the environment of use. In one embodiment up to about 800° C., in another embodiment, up to about 300° C., more preferably up to about 275° C., most preferably up to about 265° C., and preferably a pH up to about 14, most preferably up to about 12.

In another embodiment, the at least one quenching fluid receiver comprises a plurality of drain lines for capturing emitted quenching, pre-treating and washing fluids to be reused (i.e. closed loop) in the marine exhaust gas scrubbing device. The drain lines in one embodiment are constructed from any material known in the art to be corrosion and heat resistant. Preferably the material is selected from the group consisting of copper nickel (70/30), bronze, nickel aluminum bronze, duplex stainless steel, alloy 20, AL6XN, Hastelloy and GRE, and the like.

In another aspect of the invention, the marine exhaust gas scrubbing device further comprises a generator, a distributor, a collecting receiver, a cooler and a cleaner for generating, distributing, collecting, cooling and cleaning, respectively, the at least one quenching fluid, the at least one pre-treating fluid and the at least one washing fluid.

In a preferred embodiment, the marine exhaust gas scrubbing device is a closed-loop system avoiding any unwanted fluids to be expelled outside the device and into the environment.

In one embodiment, the generator comprises a metal hydroxide metering device to add fresh metal hydroxide to the at least one quenching, the at least one pre-treating and the at least one washing fluid. Preferably the metal hydroxide is in the form of an aqueous solution.

In another embodiment, the distributor comprises pumps and piping to distribute the at least one quenching, at least one pre-treating and at least one washing fluids. For a unit sized at 3.25 MW, the pumps can pump at a flow rate of between about 1500 and about 2000 gallons per minute, more preferably about 1600 and about 1900 gallons per minute and most preferably about 1800 gallons per minute. Preferably the pumps can pump at a pressure of from about 75 to 125 pounds per square inch (psi), more preferably from about 85 to about 100 psi and most preferably about 94 psi. The flow rate and pressure will vary depending on the power unit size (MW). The piping can be preferably sized to accommodate the desired quenching, pre-treating and washing fluid flow rates. The piping can be a material that can resist temperatures of up to about 800° C., preferably up to about 300° C., more preferably up to about 275° C., most preferably up to about 265° C., and preferably a pH up to about 14, most preferably up to about 12. The material is selected from any material known in the art to be corrosion and heat resistant. Preferably the material is selected from the group consisting of copper nickel (70/30), bronze, nickel aluminum bronze, duplex stainless steel, alloy 20, AL6XN, Hastelloy and GRE, and the like.

In one embodiment, the device is sized based on maximum backpressure and velocity of the gas through the system.

In another embodiment, the collecting receiver comprises a tank, vessel, container or the like that holds the quenching, pre-treating and washing fluids to be distributed to the marine exhaust gas scrubbing device. Preferably the collecting means is constructed from the same material as the distributor.

In another embodiment, the cooler comprises one or more heat exchangers for cooling the quenching, pre-treating and washing fluids after coming in contact with the high temperature exhaust gas. Preferably the cooler cools the quenching, pre-treating and washing fluids to a temperature of between about 25° C. and about 45° C., more preferably between about 30° C. and about 40° C. and most preferably about 35° C. In a preferred embodiment, the cooler uses at least one of freshwater, seawater and mixtures thereof to cool the quenching, pre-treating and washing fluids.

In a preferred embodiment, the marine exhaust gas scrubbing device of the present invention may be installed in-line in a marine exhaust gas funnel in place of an existing exhaust silencer.

In another aspect of the invention, there is provided a process for scrubbing marine exhaust gas comprising the steps of:
a) providing a high temperature exhaust gas comprising sulfur dioxide and particulate matter;
b) cooling the high temperature exhaust gas using a quenching fluid to give a cooled exhaust gas;
c) pre-treating the cooled exhaust gas using a pre-treating fluid to give a pre-treated exhaust gas;
d) washing the pre-treated exhaust gas using at least one venturi component, preferably a plurality of venturi components, said at least one venturi component comprising a venturi inlet for accepting the pre-treated exhaust gas and a venturi outlet for washing the pre-treated exhaust gas with a washing fluid to give a washed exhaust gas containing a plurality of washing fluid droplets and conveying the washed exhaust gas to the venturi outlet; preferably said at least one venturi component comprises a convergent-divergent passageway.
e) mixing the washed exhaust gas with the washing fluid using an impingement basket;
f) removing the plurality of washing fluid droplets from the washed exhaust gas to form a demisted exhaust gas;
g) exhausting the demisted exhaust gas; and
h) capturing the quenching fluid, the pre-treating fluid, the washing fluid and the demisting fluid.

In another embodiment, the quenching fluid, the pre-treating fluid and the washing fluid comprise the same or different kinds of fluid. In a preferred embodiment, the quenching fluid, the pre-treating fluid and the washing fluid comprise the same kind of fluid. Preferably the quenching fluid, the pre-treating fluid and the washing fluid are basic and comprise an aqueous solution comprising an metal hydroxide. In one embodiment, the metal hydroxide is selected from an alkali metal hydroxide, an alkaline earth metal hydroxide and combinations thereof and may be in the form of a solid or concentrated aqueous solution. More preferably the alkali metal hydroxide is selected from the group consisting of lithium hydroxide, sodium hydroxide, potassium hydroxide and combinations thereof, and the alkaline earth metal hydroxide is selected from calcium hydroxide, magnesium hydroxide and combinations thereof. Most preferably the alkali metal hydroxide is sodium hydroxide. The quenching fluid, the pre-treating fluid and the washing fluid optionally further comprises at least one of seawater, freshwater and combinations thereof.

In one embodiment, a quencher emits the quenching fluid via a plurality of quenching nozzles. The quencher preferably comprises from four to eight quenching nozzles, most preferably six quenching nozzles. Preferably, for a 3.25 MW power unit, the quenching fluid can be emitted at a flow rate of from about 15 gallons per minute (gpm) to about 25 gpm, more preferably from about 17 gpm to about 20 gpm and most preferably about 18 gpm. The quenching fluid can be emitted at a pressure of from about 40 pounds per square inch (psi) to about 80 psi, more preferably from about 50 psi to about 70 psi and most preferably about 60 psi. However, the flow rates and pressures will vary depending on the power output of the unit (MW).

In another embodiment, a pre-treater emits the pre-treating fluid via a plurality of pre-treating nozzles. The pre-treater preferably comprises from 20 to 30 pre-treating nozzles, most preferably 24 pre-treating nozzles. For a 3.25 MW power unit, preferably the pre-treating fluid can be emitted at a flow rate of from about 200 gpm to about 300 gpm, more preferably from about 225 gpm to about 275 gpm and most preferably about 242 gpm. The pre-treating fluid can be emitted at a pressure of from about 40 psi to about 80 psi, more preferably from about 50 psi to about 70 psi and most preferably about 60 psi.

In another embodiment, the washing fluid can be emitted at a flow rate of from about 25 gpm (0 gpm at dry run) to about 2000 gpm, more preferably from about 1200 gpm to about 1400 gpm and most preferably about 1300 gpm. The washing fluid can be emitted at a pressure from about 40 psi to about 80 psi, more preferably from about 50 psi to about 70 psi and most preferably about 60 psi. Once again for units of different power outputs, the flow rates and pressures will vary accordingly.

In another embodiment, said gas exhaust inlet is modular for entry of said exhaust gas into said first end, preferably said modular gas exhaust inlet further comprises at entry point, an exit point and at least one pre-quenching zone. More preferably said modular gas exhaust inlet further comprises at least one silencing zone. Preferably said at least one pre-quenching zone is proximate said entry point. Preferably said at least one pre-quenching zone is similar to said at least one quenching zone preferably with flow rates lower than said at least one quenching zone. Preferably said at least one silencing zone dissipates exhaust gas energy reducing noise caused by said exhaust gas. Preferably said at least one silencing zone comprises at least one sound baffle to baffle sound. The modular nature of said gas exhaust inlet may be sized to accommodate vessels of different sizes and configurations.

In yet another embodiment, said scrubbing device further comprises a exhaust gas inlet rotational flow element proximate said exhaust gas inlet for producing a rotational flow of said exhaust gas proximate said quenching zone, increasing the turbulence of the flow, increasing the convective heat coefficient and mass diffusion, resulting in increased quenching efficiency.

In a preferred embodiment, said exhaust gas inlet rotational flow element comprises a divided inlet, dividing said exhaust gas into at least two streams prior to entry into said quenching zone.

In a preferred embodiment, any one the above scrubbing devices is closed loop to reduce, preferably prevent discharge of said quenching, pre-treating and washing fluid into the environment and to recycle same while any one of said devices are in operation.

Further and other aspects of the present invention will become apparent to the person of skill in the art.

DETAILED DESCRIPTION OF THE PREFERRED EMBODIMENTS

The marine exhaust gas scrubbing device in one embodiment is installed in-line in the funnel of the marine exhaust gas system in lieu of the existing exhaust silencer. The system is manufactured from 316L stainless steel for resistance to sodium hydroxide and seawater, and quenching, pre-treating and washing fluids have a pH of 12 (10 mmol/l) or less. This pH level is generally considered as equivalent to "soapy water" and is classified as non-hazardous and non-corrosive. The device is preferably designed so that there is no standing seawater/quenching/pre-treating/washing fluid in order to reduce and/or prevent corrosion of the stainless steel.

Figure 1:
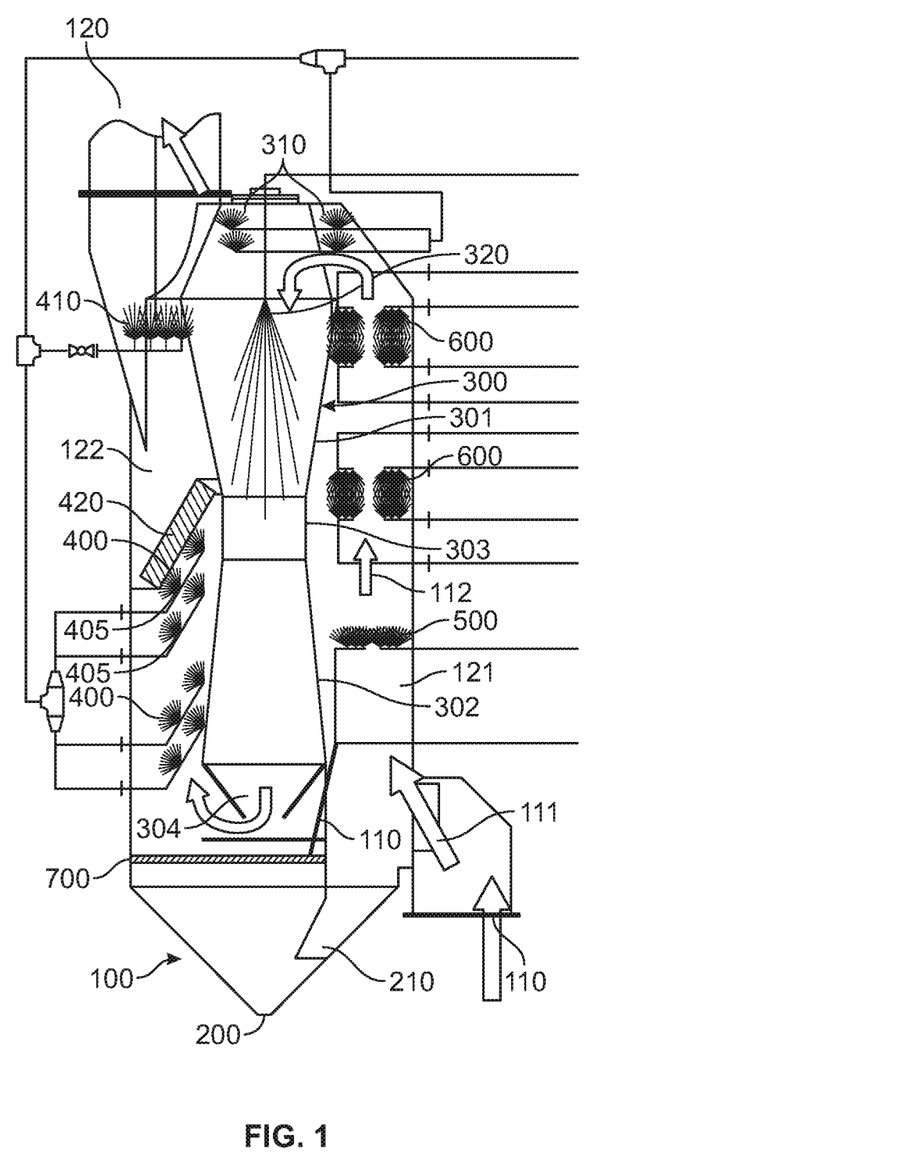
FIG. 1 shows a schematic of one embodiment of the present invention.

With reference to FIG. 1, the marine exhaust gas scrubbing device 100 contains an exhaust inlet 110, an exhaust outlet 120, a quencher 500 to cool the incoming hot exhaust gas 111, a pre-treater 600 to pre-treat the quenched exhaust gas 112, a convergent-divergent venturi 300, having a convergent zone 301, a divergent zone 302, and a convergent-divergent passageway 303. The convergent zone 301 contains a washer 320 further to mix the pre-treated exhaust gas 113 and a venturi washdown 310 to remove soot and solid material from the venturi, an impingement basket 700 for further mixing allowing for the separation and collapse of the bubbles formed during operation of the marine exhaust gas scrubbing device 100, a demister 420 to remove fluid droplets from the treated exhaust and an exit space washdown 410. Excess quenching, pre-treating and washing fluid is collected by the drain 200. The unit also includes a demister soot cleaning washdown nozzle 400.

Figure 2:
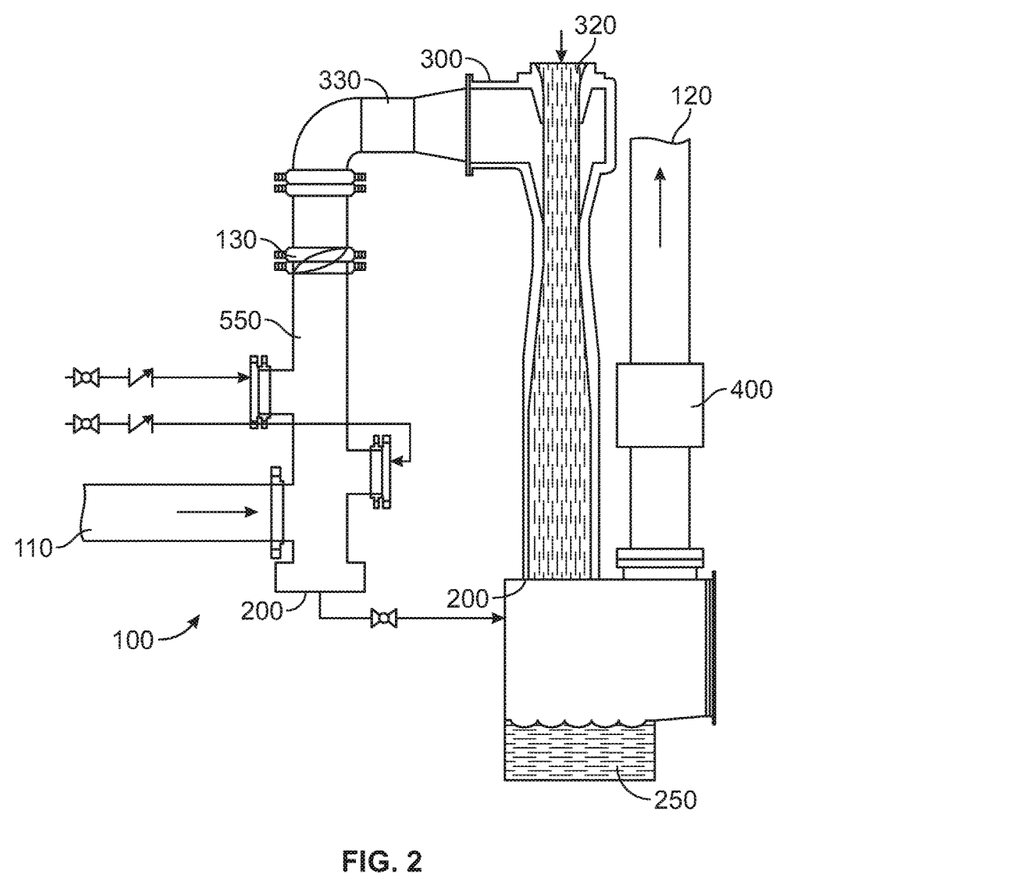
FIG. 2 shows a schematic of another embodiment of the present invention.

With reference to FIG. 2, an alternate embodiment of the marine exhaust gas scrubbing device 100 contains an exhaust inlet 110, and exhaust outlet 120, a quencher/pre-treater 550, a butterfly valve 130, a venturi 300 having a conical reducer 330 and containing a washer 320 and a demister 400. Excess quenching, pre-treating and washing fluid and washed solids are collected by the drains 200 which empty into sump 250.

Figure 3:
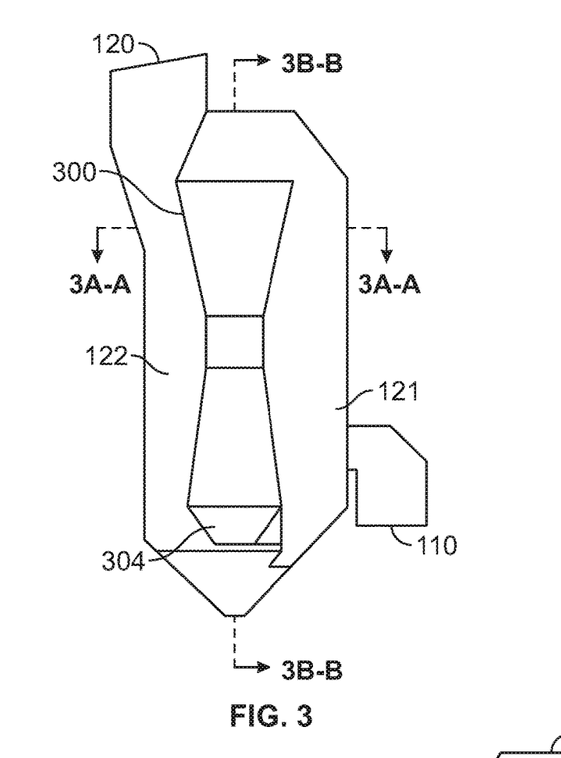
FIGS. 3, 3 A-A and 3 B-B show a schematic of an embodiment of the present invention with two venturi components.
Figure 3A:
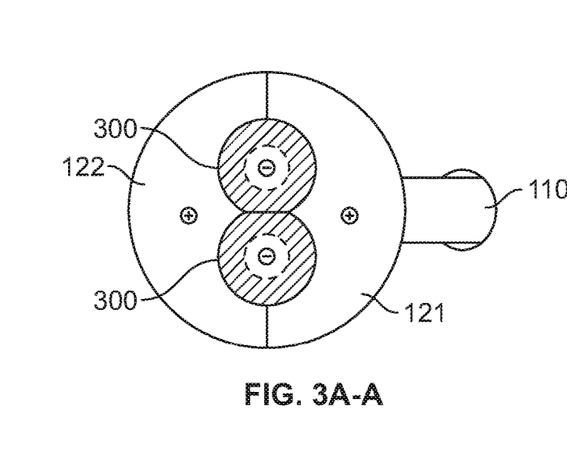
Figure 3B:
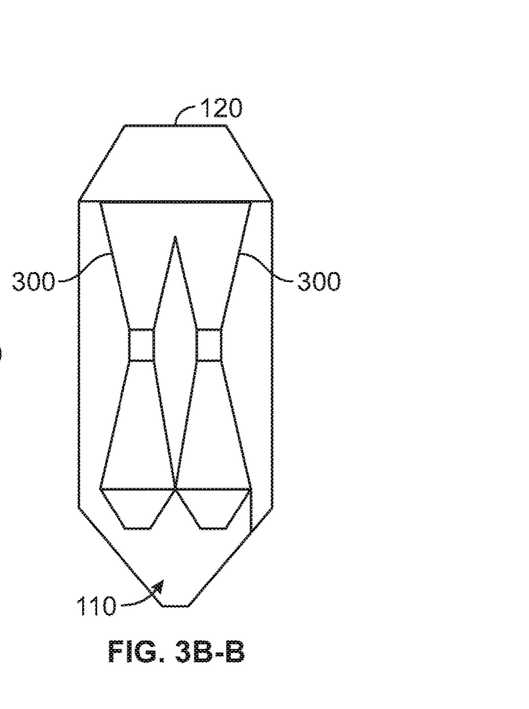

With reference to FIGS. 3, 3 A-A and 3 B-B, a marine exhaust gas scrubbing device 100 is shown having two venturi components 300 in parallel. FIG. 3 A-A provides the flowpath of the exhaust gas from the exhaust gas inlet 110, up the inlet side 121 of the device 100 into the two venturi components 300 out the venturi outlet 304, up the outlet side 122 and out the treated exhaust gas outlet 120.

Figure 4:
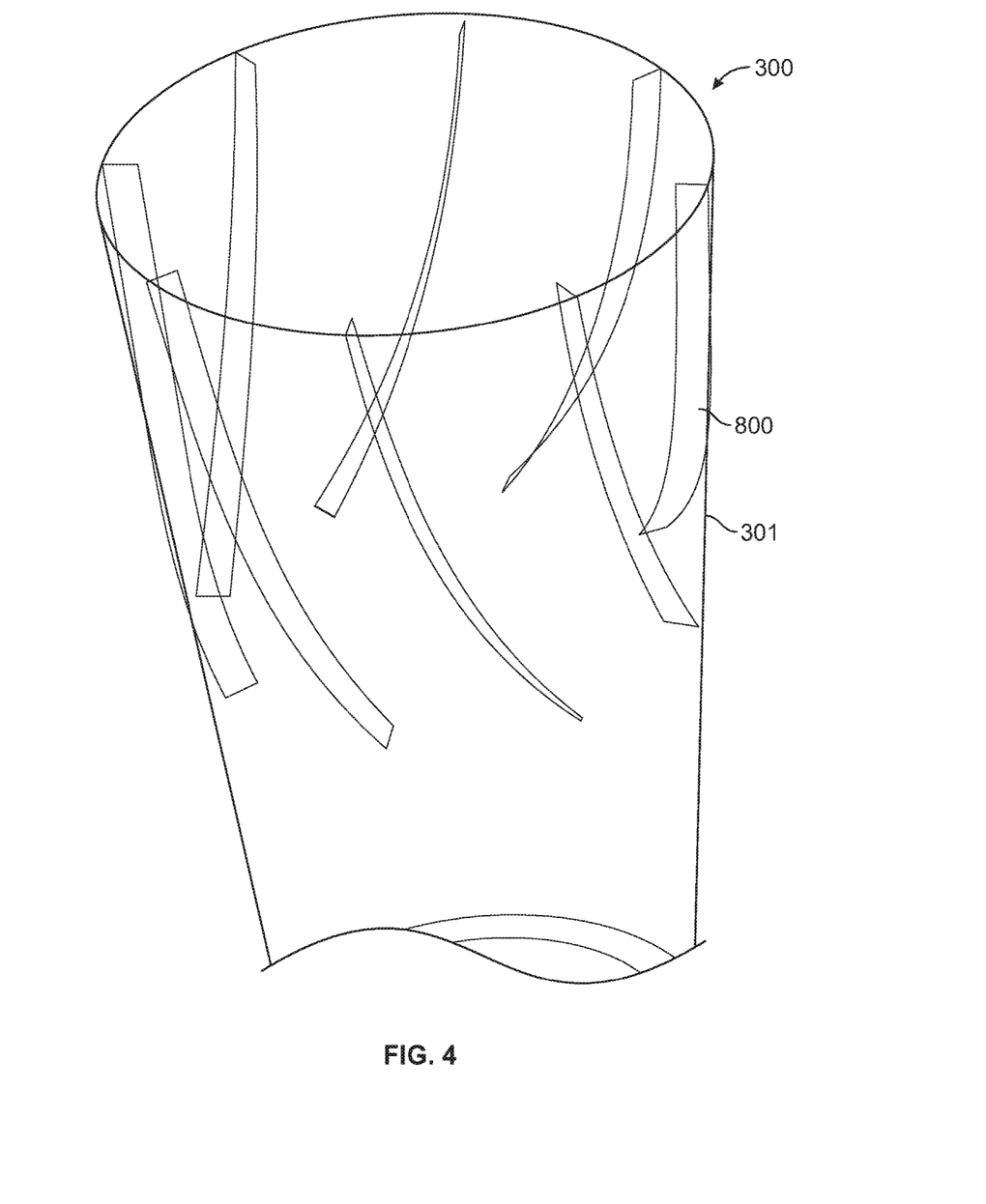
FIG. 4 shows a schematic of the embodiment of the present invention with a venturi component with rotation flow blades.

With reference to FIG. 4, the convergent zone 301 is shown with rotational flow blades 800 along the inside wall of the upper portion of the convergent zone 301. The flow blades 800 are angled (helical in configuration) to promote rotational flow of the exhaust gas into the convergent-divergent passageway 303. Although helical blades are shown herein, the rotational flow may be any surface structure along the inside of the convergent zone 301 that will promote rotational flow. Examples include but are not limited to, surface beads, surface impressions, surface etchings, ribs and combinations thereof.

Figure 5:
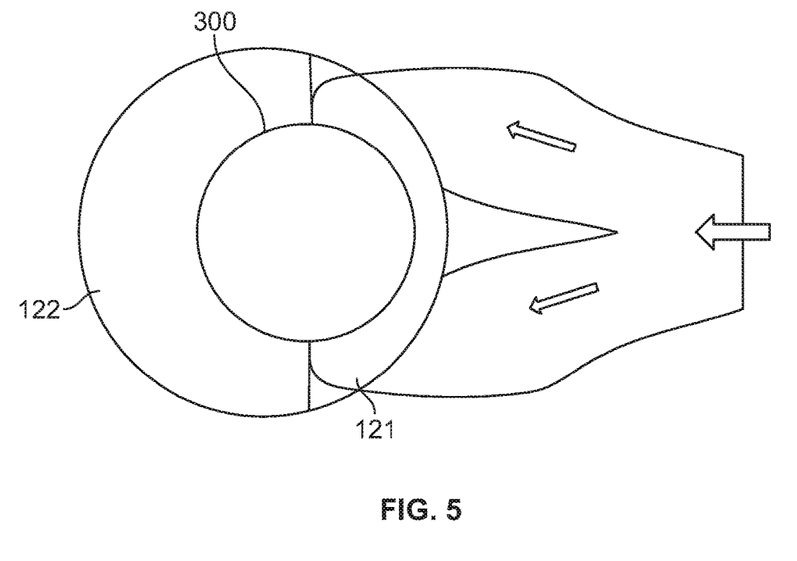
FIG. 5 shows a top view cut away of the embodiment of the present invention with a divided exhaust gas entry system.

With reference to FIG. 5, there is provided top cutaway view of the exhaust gas inlet 110 modified such that the exhaust gas 111 is divided into two streams before entering the inlet side 121 of the scrubber device 100, resulting in a rotational flow of the exhaust gas and a turbulent zone in the scrubber.

Drains

The drain 200 from the marine exhaust gas scrubbing device 100 of the present invention is designed for gravity flow of 125% of the maximum pump flow through the nozzles of the device into the collector. In a most preferred embodiment the device has two separate compartments for the pre-treatment and primary treatment. Each compartment has its own drain and is designed for maximum flow of the nozzles.

The marine exhaust gas scrubbing device of the present invention can also operate in "dry-mode" wherein no quenching, pre-treating, washing, mixing or demisting steps are employed. The device is constructed of a material that can resist in one embodiment an exhaust temperature of 265° C. The device, when in full operation, also has a backpressure less than about 150 mm (dry) and less than about 60 mm (wet). The complete unit including the exhaust piping and other equipment is below about 350 mm water column backpressure limit total for marine engines.

Optional Access for Inspection and Maintenance

Optionally included in the marine exhaust gas scrubbing device of the present invention are three external access panels in the side of the device and one internal access panel in the divider plate between the exhaust inlet 110 and exhaust outlet 120. Two of the external access panels are located above the demister 400 for demister installation and access to the upper portion of the exhaust outlet end of the device. The third external access panel is located on the lower portion of the exhaust outlet of the device for access to the interior of the device, the impingement basket 700 and primary drain.

The exhaust inlet side 121 of the marine exhaust gas scrubbing device is accessed from the exhaust outlet side 122 by an access panel in the vertical divider 123 between the exhaust inlet and exhaust outlet sides of the device for access to the exhaust inlet elbow, the inlet drain and the nozzle headers. The spray nozzle lances are also accessible by removing the headers from flanged penetrations on the exhaust inlet side of the device. Inspection points are also provided in the access panel or the device body for visual inspection and temporary testing or sampling of the exhaust gas stream.

Soot Cleaning

Optionally, to insure minimal soot build-up in the device, the wetted portions of the internal walls of the device are continually washed through the pre-treatment 600 and primary 500 nozzle systems. In particular the nozzles 405 serve as soot cleaning nozzles as well. Additional washdown spray nozzles 310 are also provided in the top of the venturi component 300, below the demister 420 (see 400) and in the exhaust outlet 120 above the demister (see 410). These nozzles may be operated as needed to wash soot from these portions of the device.

Demister and Exhaust Outlet

Proximate the exhaust outlet 120 of the marine exhaust gas scrubbing device 100 of the present invention are three pass chevron-type demisters 420 designed to eliminate mist having a preferable diameter of about 25 microns. The demisters are preferably fabricated from 316L stainless steel and are installed in the device on a Z-shaped divider panel 420 approximately halfway up the exhaust outlet side 122. The demisters are installed through access panels in the sides of the device. The demisters are designed with a maximum velocity of about 5 meters per second and a maximum pressure drop of about 65 mm water column. The demister area is also fitted with an optional washdown spray system 400 to wash any soot or dried sodium hydroxide or salts from the demister vanes.

While the water droplets are largely eliminated by the demisters 420, the exhaust gas exiting the marine exhaust gas scrubbing device is generally saturated at a temperature range of from about 35° C. to about 50° C. Some water vapour is expected to condense on the inside walls of the exhaust outlet compartment and elbow. The exhaust outlet and elbow are constructed from 316L stainless steel to prevent any problems with corrosion in these areas and any water condensed is expected to drain down through the demisters 420 and the demister support plates into the primary device drain 200. The saturated exhaust forms a white plume as the exhaust stream contacts the outside air.

Quenching, Pre-Treating and Washing Fluid

In one embodiment, the quenching, pre-treating and washing fluids are a mixture of seawater and aqueous sodium hydroxide. The sodium hydroxide is added to maintain maximum alkalinity between about pH 8 (0.1 mmol/l) and about pH 12 (10 mmol/l) and has a maximum sodium hydroxide concentration of about 0.04% by weight. The fluid solution at the maximum pH would be equivalent to "soapy water" and not considered hazardous to personnel or equipment. By-products of the expected chemical reactions are not considered hazardous or corrosive. The particulates cleaned from the marine exhaust gas may contain heavy metals and oil which should be considered to require standard handling as for used engine oil, or similar, but are not acutely hazardous to personnel or corrosive to the device components.

The quenching, pre-treating and washing fluids are cooled by a seawater heat exchanger so that it is at a target of about 35° C. for the spray systems. The maximum operating temperature of the fluid is restricted to about 65° C. in order to limit evaporation and to ensure that it remains within the operating temperatures of the composite materials of the distribution means piping.

The fluid collects sulfur dioxide, other gases and particulate matter from the marine exhaust gas stream. The sulfur dioxide is neutralized by the sodium hydroxide and the resulting particulate matter along with other solids and salt precipitate is cleaned by the cleaning means to ensure the fluid remains at 5% solids or lower.

The fluids are contained within the unit and thus the unit is closed-loop.

Fluid Piping, Valve and Pump Materials

The materials selected for the marine exhaust gas scrubbing device 100 are generally based on resistance to concentrated seawater, with additional consideration for any materials which may react with the sodium hydroxide. Suitable materials for the fluid solution include copper nickel (70/30), bronze, nickel aluminum bronze, duplex stainless steel, alloy 20, nickel alloys and glass reinforced epoxy (GRE). Suitable materials for a diluted sodium hydroxide solution are selected based on the Handbook of Corrosion Data and include copper nickel (70/30), bronze, 316 stainless steel, duplex stainless steel, alloy 20, AL6XN, Hastelloy and GRE. The recommended material for seawater and sodium hydroxide solution are based primarily on resistance to seawater and include copper nickel (70/30), bronze, nickel aluminum bronze, duplex stainless steel, alloy 20, AL6XN, Hastelloy and GRE. 316 stainless steel is suitable for valves due to the increased material thickness and because the valves are able to be removed for inspection and replacement, as necessary.

The quenching 500, pre-treating 600, washing 320 and washdown 400 nozzles, in the marine exhaust gas scrubber device are metal piping as required to withstand the dry-mode operating temperature of about 265° C. This metallic piping is most preferably super duplex stainless steel (Sandvik™ SAF2507 or Zenon 100™) or similar material suitable for high temperature seawater systems.

Circulation of the fluids is accomplished using pumps and pumping systems known in the art for pumping corrosive and high temperature fluids.

The fluid system includes the following fluid and washdown nozzles, lances and headers:
1) Quencher: 6× nozzles at total 18 gpm at 60 psi,
2) Upper Pre-treatment: 12× nozzles at total 242 gpm at 60 psi
3) Lower Pre-treatment: 12× nozzles at total 242 gpm at 60 psi
4) Washing: single nozzle at 1300 gpm at 60 psi
5) Top washdown: 4× nozzles at total 13 gpm at 25 psi
6) Demisting: 8× nozzles at total 25 gpm at 25 psi
7) Optionally a demister washdown: 1 nozzle at 5 gpm at 60 psi; and
8) Exhaust Outlet washdown: 4× nozzles at total 13 gpm at 25 psi.

The nozzles are 316 stainless steel and are threaded into welded super duplex stainless steel bosses on the lances. The nozzles are removable and replaceable.

Collection Tank

The quenching, pre-treating and washing fluids drain from the marine exhaust gas scrubbing device of the present invention into a fluid circulation tank (not shown). The tank is used to drain all fluid from the device so that there is no standing fluid in the device or local metal supply piping. The tank also collects the fluid and maintains sufficient fluid for pump suction and provides for connections for the treatment fluid injection. Although the capacity of the fluid circulation tank may vary, the tank depicted herein has a total capacity of about 3,000 liters (790 gallons) and a maximum operating capacity of about 2,000 liters (530 gallons) sufficient to collect any water that may drain back into the tank from the fluid circulation piping and marine exhaust gas scrubbing device without possibility of overflowing.

The bottom of the tank slopes to a treatment system drain. The collection tank is fitted with high level switches to ensure that the tank is not overfilled and for control of makeup and fluid water and a magnetic type sight glass for visual level indication. In one option, the tank also has an integral overflow to the bilge waste tank of the vessel to prevent spilling of dirty fluid on the deck in the unlikely event of a tank overflow.

The tank is fabricated from steel with all flanges less than 10 inches in diameter fabricated from super duplex stainless steel. The interior of the tank is coated with a seawater and sodium hydroxide resistant epoxy coating.

The fluid drains from the marine exhaust gas scrubbing device by gravity into a drain header located at least 150 mm below the minimum operation level of the tank to prevent exhaust gas from entering the circulation tank or from crossing over from the pre-treatment to the primary treatment compartments of the device.

The fluid is drawn from the tank by a circulation pump suction header (through the heat exchangers). The maximum operating temperature of the fluid in the circulation tank is limited to 65° C. to ensure that it remains within the operating temperatures of the composite materials of the circulation system piping. In one embodiment, the tank is vented to atmosphere.

Quenching, Pre-Treating and Washing Fluid Properties

The fluid used to scrub the marine exhaust gas is maintained at a desired pH by injection of more concentrated sodium hydroxide from the fluid generator. This includes fluid mixing and storage tank, piping and fluid pump.

In another embodiment, the quenching, pre-treating and washing fluid is a mixture of fresh water and dry concentrated sodium hydroxide pellets or liquid concentrated sodium hydroxide added to the fluid mixing and storage tank. The sodium hydroxide is added to maintain an alkalinity of approximately pH 12 (1000 mmol/l) and has a maximum sodium hydroxide concentration of approximately 10% by weight. The fluid solution at the maximum pH would be equivalent to household drain cleaner and is considered hazardous and corrosive to personnel and equipment.

Seawater Cooling System

The seawater cooling system is required to dissipate the heat transferred from the hot exhaust gas to the quenching, pre-treating and washing-fluid. Preferably, the fluid temperature after cooling is about 35° C. For a 3.25 MW output unit, the required heat capacity of the system is calculated as 3,479 MJ/hour based on the exhaust flow rate and temperature of the current system and accounting for the heat lost through vapourization of the fluid. This has also been confirmed through CFD analysis. The heat rate will vary for other sized units and other types of engines.

The full flow of the fluid system is pumped through a heat exchanger, typically plate type heat exchangers, (in other instances a tube and shell heat exchanger), located on the suction side of the fluid circulation pumps. Several heat exchangers are arranged in parallel in order to meet the required flow rate with standard sized heat exchangers and to allow for one heat exchanger to be taken offline for cleaning while maintaining 66% of the maximum capacity.

Quenching, Pre-Treating and Washing-Fluid Treatment System

The quenching, pre-treating and washing fluid treatment system processes particulate-loaded solution (pH 12, 10 mmol/l or less) collected in the fluid circulation tank to allow for water recirculation in exhaust gas cleaning. The fluid treatment system is triggered by fluid in the circulation tank reaching a 5% or greater solids level. The 5% solids fluid is pumped from the circulation tank to a clarifier where the particulate matter is settled and clean water is overflowed back to the tank for recirculation.

Controlling and Monitoring

The marine exhaust gas scrubbing device is controlled by a main control system. The control system is programmed with redundancy fail safe and an intuitive Human Machine Interface.

For example, the ABB PLC™ used in the operation of the marine exhaust gas scrubbing device and fluid treatment system is considered to be a major control system component and is certified by DNV for this use. In one embodiment the instrumentation and sensors used to control, monitor and log the system include:

Exhaust Gas Analyzer (SOx and $CO_2$)
Fluid Circulation Tank Pressure
Fluid Header Flow
Fluid Header Temperature
Fluid Return Temperature
Fluid Header Pressure
Fluid Pump Pressure
Seawater Pump Pressure
Marine exhaust gas scrubber Exhaust Inlet Pressure (outlet is at atmospheric pressure)
Marine exhaust gas scrubber Exhaust Inlet Temperature
Marine exhaust gas scrubber Exhaust Outlet Temperature
Circulation Tank pH
Treatment Fluid pH
Fluid Level (low, high & high-high)
Treatment Fluid Mixing and Storage Tank Level (low & high)
Treatment Fluid Spill Tray Leak Detection
Fluid Circulation Tank Overflow Detection
Marine exhaust gas scrubber Sump Overflow Detection
Fluid Circulation Tank Level Sightglass (Magnetic)
Treatment Fluid Tank Level Sightglass (Magnetic)

In operation, exhaust gas from a marine engine enters the marine exhaust gas scrubbing device 100 through the exhaust inlet 110. Quencher 500 emits quenching fluid to cool the exhaust gas. The cooled exhaust gas travels through the pre-treater 600 which emits pre-treating fluid to further cool and react with the exhaust gas. The pre-treated exhaust gas travels into the convergent-divergent venturi 300 and through the venturi washer 320 to continue mixing the washing fluid with the exhaust gas. The venturi washdown 310 wets the surfaces of the venturi 300 to dislodge any soot or solid material that forms. The washed exhaust gas travels past the impingement basket 700 further to remove and collect formed solids. The exhaust gas passes through the demister 420 to remove droplets of washing/pre-treating/quenching fluid from the exhaust gas stream. After a final pass through the exhaust washdown 410, the treated and demisted exhaust gas exits the marine exhaust gas scrubbing device via the exhaust outlet 120.

In operation of an alternate embodiment, exhaust gas from a marine engine enters the marine exhaust gas scrubbing device 100 through the exhaust inlet 110. Quencher/pre-treater 550 cools and pre-treats the exhaust gas and butterfly valve 130 induces further mixing of the exhaust gas with the quenching/pre-treating fluid. The pre-treated exhaust gas travels into the convergent-divergent venturi 300 and through the venturi washer 320 to continue mixing the washing fluid with the exhaust gas. The washed exhaust gas travels past sump 250 further to remove and collect formed solids and to collect excess quenching, pre-treating and washing fluid. The exhaust gas passes through the demister 420 to remove droplets of washing/pre-treating/quenching fluid from the exhaust gas stream. The treated and demisted exhaust gas exits the marine exhaust gas scrubbing device via the exhaust outlet 120.

EXAMPLES

Example 1

Three scrubbing performance tests were carried out using the marine exhaust gas scrubbing device of the present invention affixed to a 600 kW diesel engine. In Trial 1, the scrubbing device was run for 108 minutes at 100% engine load with an engine speed of 1750-1800 RPM. During that time the quencher and venturi were in operation with a butterfly valve between the quencher and venturi (to create a turbulent mixing zone) in either a fully open (0°), or partially closed (22° or 45°) position. In Trial 2, the scrubbing device was run for 35 minutes at 100% engine load with an engine speed of 1800 RPM. After 14 minutes, the butterfly valve was closed to 22° and after 20 minutes the quencher was activated. In Trial 3, the scrubbing device was run for 108 minutes at 100% engine load with an engine speed of 1800 RPM. After 13 minutes the venturi was activated; after 18 minutes the quencher was activated; after 49 minutes the venturi was deactivated; after 58 minutes the butterfly valve was closed to 22°; after 62 minutes the butterfly valve was closed to 45°; after 101 minutes sodium hydroxide solution was provided to the quencher. $SO_x$, $CO_2$ and particulate matter measurements were taken before and after scrubbing of marine engine exhaust.

The device demonstrated on average 99% $SO_2$ scrubbing of the engine exhaust stream: the $SO_2$ content in the exhaust gas stream was reduced to 0-10 ppm from 1000 ppm $SO_2$ gas, which is equivalent to scrubbing the $SO_2$ produced from burning 1.5% to 3.5% sulfur laden fuel to the 0.1% IMO sulfur regulation limit. In addition, the system consistently captured 80-90% of the PM (particulate matter) by mass.

The table below contains data from the scrubbing performance tests:

| Value | Trial 1 | | | Trial 2 | | | Trial 3 | | |
|---|---|---|---|---|---|---|---|---|---|
| | $SO_x$ level ppm | $CO_2$ level ppm | PM level | $SO_x$ level ppm | $CO_2$ level ppm | PM level | $SO_x$ level ppm | $CO_2$ level ppm | PM level |
| Manifold | 1100 | 200 | 85% | 1050 | 200 | 85% | 975 | 200 | 90% |
| Quencher—$H_2O$ | 1100 | 200 | removal | 1050 | 200 | removal | 975 | 200 | removal |
| Quencher—NaOH | 600 | 200 | by mass | 625 | 200 | by mass | 575 | 200 | by mass |
| Venturi | 0 | 200 | | 0 | 200 | | 0 | 200 | |
| Sump | 0 | 197 | | 0 | 192 | | 0 | 196 | |
| Heat Exchanger | 0 | — | | 0 | N/A | | 0 | N/A | |
| Outlet | 0 | 0 | | 0 | 192 | | 0 | 196 | |

Example 2

Figure 6:
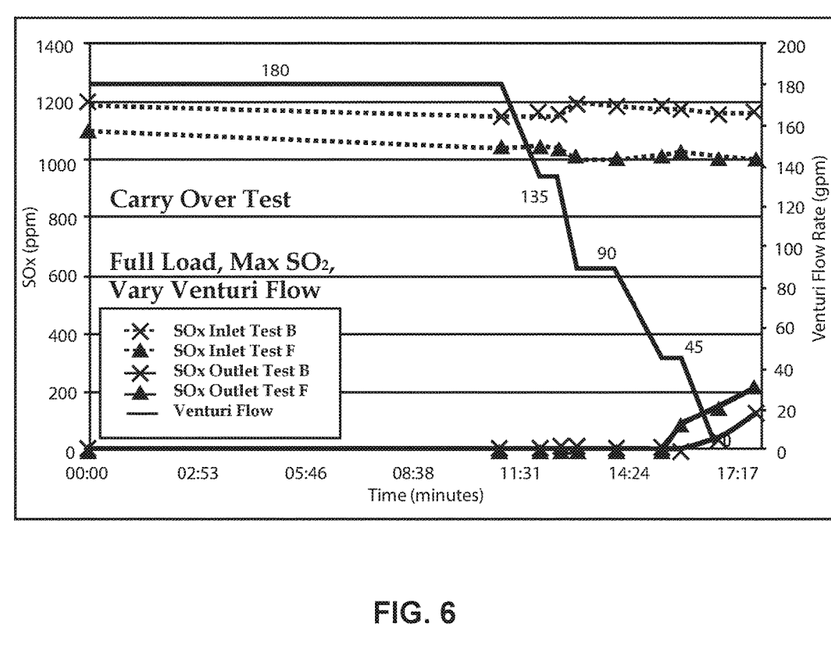
FIG. 6 demonstrates the results for Tests B and F showing the systems capability of $SO_2$ removal and its correlation to the venturi flow rate (gpm).

In another series of tests, the effectiveness of $SO_2$ reduction as a function of venturi flow was assessed. In a first test (Test B) using a diesel engine operating at full load at an engine speed of 1600 RPM, $SO_2$ concentration of the exhaust stream was measured at the exhaust manifold and the venturi outlet. Over a period of 17 minutes the venturi flow rate was reduced from 180 gallons per minute (gpm) to 0 gpm (See FIG. 6). In a second test (Test F) using a diesel engine operating at full load, $SO_2$ concentration of the exhaust stream was measured at the exhaust manifold and the venturi outlet. Over a period of nine minutes the venturi flow rate was reduced from 180 gpm to 0 gpm (See FIG. 6).

One embodiment of the present disclosure resulted in an increase in the scrubbing efficiency of the system. This was accomplished by adding chemical scrubbing capability to the Quencher, the last of the three quencher nozzles concurrently sprays NaOH directly into an adjustable butterfly valve. This creates a turbulent mixing zone prior to the concentric venturi component to further remove any $SO_2$ from the gas stream not removed via the concentric venturi component.

Example 3

In another test of an embodiment of the marine exhaust gas scrubbing device of the present invention, the device was run at 75% engine load at an engine speed of 1750 rpm. Quenching fluid was emitted from the quenchers at 1.5 gpm at a pressure of 60 psi. The $SO_2$ level at the device inlet was measured at 1000 ppm and at the device outlet was measured at 0 ppm with a CO level of 301 ppm, a NO level of 633 ppm and a $NO_2$ level of 2443 ppm.

Example 4

Four additional trials of the marine exhaust gas scrubbing device were carried out. In Trial 1 at an engine speed of 1000 rpm, under an engine load of 15% and with the venturi in operation, the inlet $SO_2$ level was 1000 ppm and the outlet $SO_2$ level was 0 ppm, the CO level was 258 ppm, the NO level was 366 ppm and the $NO_2$ level was 439.2 ppm. In Trial 2 at an engine speed of 1200 rpm, under an engine load of 12% and with the venturi in operation, the inlet $SO_2$ level was 1000 ppm and the outlet $SO_2$ level was 0 ppm, the CO level was 619 ppm, the NO level was 273 ppm and the $NO_2$ level was 327.6 ppm. In Trial 3 at an engine speed of 1400 rpm, under an engine load of 13% and with the venturi in operation, the inlet $SO_2$ level was 1000 ppm and the outlet $SO_2$ level was 0 ppm, the CO level was 158 ppm, the NO level was 228 ppm and $NO_2$ level was 273.6 ppm. In Trial 4 at an engine speed of 1599 rpm, under an engine load of 17% and with the venturi in operation, the inlet $SO_2$ level was 1000 ppm and the outlet $SO_2$ level was 0 ppm, the CO level was 148 ppm, the NO level was 211 ppm and the $NO_2$ level was 253.2 ppm.

As many changes can be made to the preferred embodiment of the invention without departing from the scope thereof, it is intended that all matter contained herein be considered illustrative of the invention and not in a limiting sense.

The invention claimed is:

1. A marine exhaust gas scrubbing device comprising:
   a) an enclosure having a first end and a second end;
   b) an exhaust gas inlet proximate said first end for accepting a high temperature exhaust gas comprising sulfur dioxide and particulate matter;
   c) at least one quencher proximate the exhaust gas inlet for cooling the high temperature exhaust gas with at least one quenching fluid to give a cooled exhaust gas;
   d) at least one pre-treater for pre-treating the cooled exhaust gas with at least one pre-treating fluid to give a pre-treated exhaust gas;
   e) at least one venturi component comprising a venturi inlet for accepting the pre-treated exhaust gas and a venturi outlet for washing the pre-treated exhaust gas with at least one washing fluid to give a washed exhaust gas containing a plurality of washing fluid droplets and conveying the washed exhaust gas to the venturi outlet;
   f) an impingement basket proximate the venturi outlet for providing additional mixing of the washed exhaust gas with the washing fluid;
   g) at least one demister for removing the plurality of washing fluid droplets from the washed exhaust gas to form a demisted exhaust gas;
   h) an exhaust gas outlet at said second end for exhausting said demisted exhaust gas; and
   i) a receiver for receiving the at least one quenching fluid, the at least one pre-treating fluid and the at least one washing fluid.

2. The device of claim 1 wherein the at least one quenching fluid, the at least one pre-treating fluid and the at least one washing fluid are basic.

3. The device of claim two wherein the at least one quenching fluid, the at least one pre-treating fluid and the at least one washing fluid comprise an aqueous alkali metal hydroxide solution selected from the group consisting of lithium hydroxide, sodium hydroxide, potassium hydroxide, an aqueous alkaline earth metal hydroxide solution selected from calcium hydroxide, magnesium hydroxide, and combinations thereof.

4. The device of claim 1 wherein the at least one venturi component is a concentric venturi further comprising a convergent-divergent passageway joining the venturi inlet with the venturi outlet.

5. The device of claim 3 wherein the alkali metal hydroxide is sodium hydroxide.

6. The device of claim 1 wherein the at least one quenching fluid, the at least one pre-treating fluid, the at least one washing fluid have a pH of from about 8 to about 12.

7. The device of claim 1 wherein the enclosure, the at least one quencher, the at least one pre-treater, the at least one venturi, the impingement basket and the at least one demister are constructed of material resistant to a temperature of up to about 300° C.

8. The device of claim 1 further comprising a generator for generating the at least one quenching fluid, the at least one pre-treating fluid and the at least one washing fluid.

9. The device of claim 1 further comprising a distributor for distributing the at least one quenching fluid, the at least one pre-treating fluid and the at least one washing fluid.

10. The device of claim 1 further comprising a collecting receiver for receiving the at least one quenching fluid, the at least one pre-treating fluid and the at least one washing fluid.

11. The device of claim 1 further comprising a cooler for cooling the at least one quenching fluid, the at least one pre-treating fluid and the at least one washing fluid.

12. The device of claim 1 further comprising a cleaner for cleaning the at least one quenching fluid, the at least one pre-treating fluid and the at least one washing fluid.

13. The device of claim 1 wherein said device is closed-loop.

14. A process for scrubbing marine exhaust gas comprising the steps of:
   a) providing a high temperature exhaust gas comprising sulfur dioxide and particulate matter;
   b) cooling the high temperature exhaust gas using a quenching fluid to give a cooled exhaust gas;
   c) pre-treating the cooled exhaust gas using a pre-treating fluid to give a pre-treated exhaust gas;
   d) washing the pre-treated exhaust gas using at least one venturi component comprising a venturi inlet for accepting the pre-treated exhaust gas and a venturi outlet for washing the pre-treated exhaust gas with a washing fluid to give a washed exhaust gas containing a plurality of washing fluid droplets and conveying the washed exhaust gas to the venturi outlet;
   e) mixing the washed exhaust gas with the washing fluid using an impingement basket;
   f) removing the plurality of washing fluid droplets from the washed exhaust gas to form a demisted exhaust gas;
   g) exhausting the demisted exhaust gas; and
   h) capturing the quenching fluid, the pre-treating fluid, and the washing fluid.

15. The process of claim 14 wherein the quenching fluid, pre-treating fluid and washing fluid are basic.

16. The process of claim 15 wherein the quenching fluid, pre-treating fluid and washing fluid comprises an aqueous alkali metal hydroxide selected from the group consisting of lithium hydroxide, sodium hydroxide, potassium hydroxide, an aqueous alkaline metal earth hydroxide selected from calcium hydroxide, magnesium hydroxide, and combinations thereof.

17. The process of claim 16 wherein the alkali metal hydroxide is sodium hydroxide.

18. The process of claim 14 wherein the quenching fluid, the pre-treating fluid, and the washing fluid have a pH of from about 8 to about 12.

19. The process of claim 14 further comprising a process for generating the quenching fluid, the pre-treating fluid and the washing fluid.

20. The process of claim 14 further comprising a process for distributing the quenching fluid, the pre-treating fluid and the washing fluid.

21. The process of claim 14 further comprising a process for collecting the quenching fluid, the pre-treating fluid and the washing fluid.

22. The process of claim 14 further comprising a process for cooling the quenching fluid, the pre-treating fluid and the washing fluid.

23. The process of claim 14 further comprising a process for cleaning the quenching fluid, the pre-treating fluid and the washing fluid.

24. The process of claim 14 wherein said process is closed-loop.

* * * * *